United States Patent [19]

Kogushi et al.

[11] Patent Number: 5,598,284
[45] Date of Patent: Jan. 28, 1997

[54] ELECTRO-OPTICAL DEVICE DEFINED BY RELATIONSHIP OF DATA VOLTAGE, RESIDUAL VOLTAGE, SPONTANEOUS POLARIZATION, AND LIQUID CRYSTAL TIME CONSTANT AND CAPACITANCE

[75] Inventors: Noriaki Kogushi, Tokyo; Takeshi Nishi; Masaaki Hiroki, both of Kanagawa; Toshiharu Yamaguchi, Gifu; Toshimitsu Konuma, Kanagawa, all of Japan

[73] Assignee: Semiconductor Energy Laboratory Co., Ltd., Kanagawa-ken, Japan

[21] Appl. No.: 358,179

[22] Filed: Dec. 16, 1994

[30] Foreign Application Priority Data

Dec. 25, 1993 [JP] Japan .................. 5-347676

[51] Int. Cl.$^6$ .................. G02F 1/133; G02F 1/1343; G02F 1/13; G09G 3/36
[52] U.S. Cl. .................. 349/33; 345/90; 345/92; 349/38; 349/172; 349/174
[58] Field of Search .................. 345/90,92; 359/56, 359/78, 100

[56] References Cited

U.S. PATENT DOCUMENTS

| | | | |
|---|---|---|---|
| 4,815,823 | 3/1989 | Kaneko | 359/54 |
| 5,227,900 | 7/1993 | Inaba et al. | 359/56 |
| 5,363,225 | 11/1994 | Minamihara et al. | 359/100 |
| 5,465,168 | 11/1995 | Koden et al. | 359/84 |
| 5,473,449 | 12/1995 | Takemura et al. | 359/56 |

OTHER PUBLICATIONS

Armitage, "Gray Scale Ferroelectric Liquid Devices", Liquid Crystal Displays and Applications, Proceedings SPIE–The International Soc. for Optical Engineering, vol. 1257, 1990, pp. 116–124.

Hartmann, "Charge–Controlled Phenomena in the Surface–Stabilized Ferroelectric Liquid Crystal Structure", Journal of Applied Physics, vol. 66, No. 3, 1989, pp. 1132–1136.

Primary Examiner—Anita Pellman Gross
Assistant Examiner—Walter J. Malinowski
Attorney, Agent, or Firm—Sixbey Friedman Leedom & Ferguson; Gerald J. Ferguson, Jr.; Evan R. Smith

[57] ABSTRACT

A liquid crystal electro-optical device has electrodes, a pair of substrates at least one of which is transparent, thin-film transistors provided on one of the pair of substrates, and a ferroelectric or antiferroelectric liquid crystal material, or a ferroelectric or antiferroelectric liquid crystal material mixed with a polymer compound held between the pair of substrates. A particular relationship is established between spontaneous polarization of the liquid crystal material, a capacitance between pixel electrodes, a pulse voltage applied to gates of the transistors, a time constant of a pixel, a residual pixel voltage immediately before application of the next pulse, and other parameters.

26 Claims, 8 Drawing Sheets

FIG. 3A — SINGLE PULSE
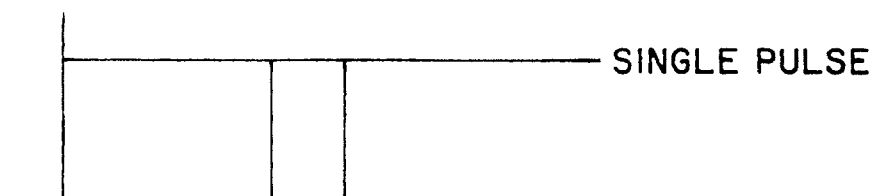
FIG. 3B — SINGLE PULSE
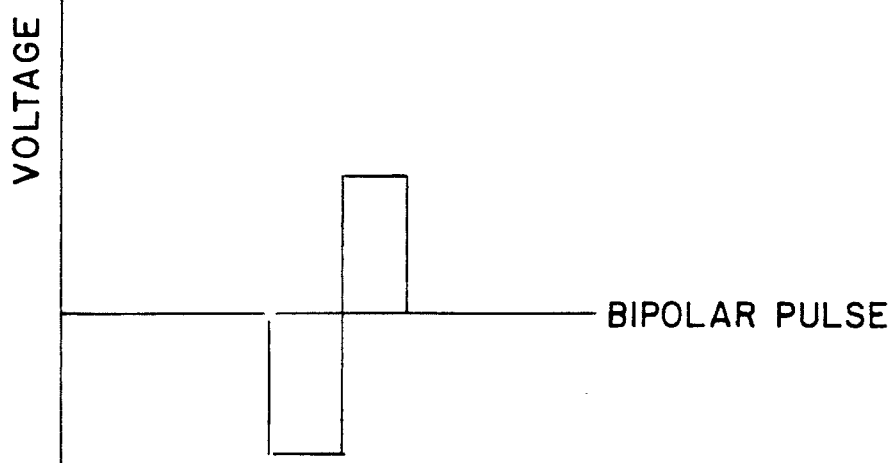
FIG. 3C — BIPOLAR PULSE
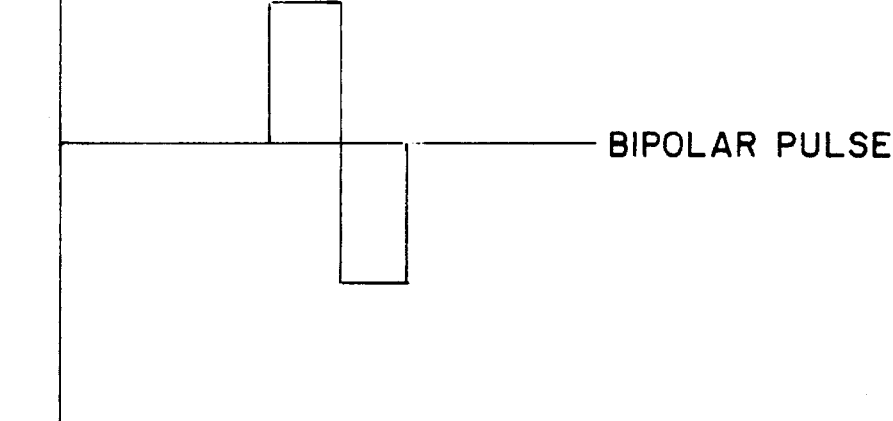
FIG. 3D — BIPOLAR PULSE

ELECTRO-OPTICAL DEVICE DEFINED BY RELATIONSHIP OF DATA VOLTAGE, RESIDUAL VOLTAGE, SPONTANEOUS POLARIZATION, AND LIQUID CRYSTAL TIME CONSTANT AND CAPACITANCE

BACKGROUND OF THE INVENTION

The present invention relates to a liquid crystal electro-optical device using thin-film transistors (hereinafter referred to as TFTs) as drive switching elements in which device the liquid crystal material is a ferroelectric liquid crystal or an antiferroelectric liquid crystal each of which has spontaneous polarization and is superior in high-speed response, or what is called a polymer liquid crystal (also called a dispersion-type liquid crystal) that is a, ferroelectric or antiferroelectric liquid crystal containing a polymer.

In particular, the invention relates to a liquid crystal electro-optical device which provides gradations by controlling a period in which a liquid crystal is optically transparent or non-transparent to express (display) a halftone color or light and shade.

A liquid crystal composition exhibits a different light transmittance and refractive index depending on an external electric field. Utilizing this property, an electrical signal can be converted to an optical signal, which is then used for a display. Among liquid crystal materials are a TN (twisted nematic) liquid crystal, a STN (supertwisted nematic) liquid crystal, a ferroelectric liquid crystal and an antiferroelectric liquid crystal. In recent years, a material called a polymer liquid crystal (also called a dispersion-type liquid crystal) is used, that is a nematic, ferroelectric or antiferroelectric liquid crystal containing a polymer material. It is known that liquid crystals cannot react Co a variation of an external voltage in an infinitely short time, but need a certain time. Each liquid crystal material has its own response time. The response time is several tens of milliseconds in TN liquid crystals, several hundred milliseconds in STN liquid crystals, several tens of microseconds in ferroelectric liquid crystals, and several tens of milliseconds in polymer (dispersion-type) liquid crystals using a nematic liquid crystal.

At the present time, active-matrix type devices can produce the best image quality among display devices using a liquid crystal. Conventional active-matrix type liquid crystal electro-optical devices use thin-film transistors (TFTs) as active elements, and an amorphous or polycrystalline semiconductor is used for the TFTs. Only one of a P-type TFT or an N-type TFT is used in a single pixel. Usually, an N-channel TFT (NTFT) is connected in series to a pixel. Signal voltages are applied to matrix signal lines. When a TFT located at an intersection of signal lines receives both signal voltages, it is turned on. Utilizing this phenomenon, on/off states liquid crystal pixels are controlled individually. By controlling the pixels in this method, a high-contrast liquid crystal electro-optical device can be realized.

However, it is very difficult for the conventional active-matrix type devices to provide a display with gradations that includes light and shade or a halftone color. Conventionally, to enable a display with gradations, there has been investigated a scheme which utilizes the phenomenon that the light transmittance of a liquid crystal varies with the magnitude of a voltage applied thereto.

However, the voltage dependence of the light transmittance of a liquid crystal has very strong nonlinearity. Since the light transmittance abruptly varies at a particular voltage, it may be the case that only a several percent variation of the pixel voltage causes a very large variation in the light transmittance. Therefore, where respective liquid crystal pixels receive different voltages due to nonuniformity in TFTs and a matrix wiring, conventional analog gradation display methods cannot provide gradations more than 16. For example, what is called a transition region (where the light transmittance changes) of TN liquid crystal materials has a range as narrow as 1.2 V. To attain the 16-gradation display, it is necessary to control voltages in a small value of 75 mV. This results in a much lowered production yield. TFTs and a matrix wiring are required to be very uniform.

Because of the difficulty in performing gradation display as described above, liquid crystal display devices have a great disadvantage in competing with CRT (cathode ray tube) displays, which are conventional, generally employed display devices. To solve this problem, the present inventors have found that it is possible to obtain visual gradations by controlling a time during which a voltage is applied to a liquid crystal, as disclosed in detail in Japanese Patent Application No. Hei. 3-169306.

However, in the case of TN liquid crystal displays, the application voltage is required to have accuracy in the same level as in the conventional analog gradation display methods. More specifically, a level "10" as displayed by applying an on-voltage of 5 V to pixels is seen about 2% darker than a level "10", as displayed by applying 5.1 V. Therefore, this type of gradation display method requires TFTs to have as small a variation as the conventional gradation display methods.

As described above, the reason why the pixel voltage needs to be controlled precisely is that a TN liquid crystal changes its light transmittance with the effective value of a voltage applied thereto. The same thing is true also in STN liquid crystals and dispersion-type liquid crystals using a nematic liquid crystal, which is a basic material of the above liquid crystals.

To solve the above problems, there has been proposed, in a liquid crystal electro-optical device that uses thin-film transistors as drive switching elements and performs the above-described gradation display method, a method which uses a ferroelectric or antiferroelectric liquid crystal material, or what is called a polymer liquid crystal (also called a dispersion-type liquid crystal) that is a ferroelectric or antiferroelectric liquid crystal containing a polymer. In this method, gradation display is obtained by controlling a time during which a liquid crystal is in a transparent (light) state or a non-transparent (dark) state. Details are disclosed in Japanese Patent Application No. Hei. 4-333605, for instance.

To obtain transparent and non-transparent states by driving a ferroelectric liquid crystal by an external electric field or the like, it is necessary to reverse spontaneous polarization of the liquid crystal material. Where, as in the case of active driving, the driving method is such that the switching elements are made off during a non-selection period to interrupt external charge supply, it is necessary to consider a relationship between the amount of charge injected into a pixel during a selection period and spontaneous polarization of the liquid crystal material.

In particular, to perform high-resolution gradation display according to the above-described gradation display method, in which case switching between light and dark states is performed in several microseconds (shortest case), the charge supply and the charge consumption due to the reversal of polarization should be balanced very strictly.

In the conventional method, although it is considered to supply sufficient charge for reversing the polarization of the liquid crystal material, no consideration is made of a series resistance between the electrodes, a leak conductance and a pixel charging/discharging time due to a pixel impedance, which factors are important in connection with the charge injection into the electrodes. Therefore, the conventional method has a problem that when it is intended to increase the number of gradations, desired gradation performance is not obtained, for instance, gradation levels become indefinite.

SUMMARY OF THE INVENTION

An object of the present invention is to provide a liquid crystal electro-optical device that performs gradation display by controlling periods of light and dark states of a liquid crystal which device can provide more definite gradation levels and an increased number of gradations.

According to the invention, to solve the above problems, there are provided liquid crystal electro-optical devices having configurations that are characterized by the formulae described below.

[1] Configuration of Liquid Crystal Electro-Optical Device

FIG. 1 shows a basic configuration of a liquid crystal electro-optical device to which the present invention can be applied. In FIG. 1, reference numerals 101 and 102 denote substrates at least one of which is transparent; 103, pixel electrodes; 104, an opposite electrode; 105, switching elements, such as thin-film transistors, connected to the respective pixel electrodes 103 at respective ones of sources and drains of the transistors; 106, an orientation film that has been subjected to a uniaxial orientation treatment and is provided on at least one of the substrates 101 and 102; 107, an electro-optical modulating layer provided between the substrates and comprising a ferroelectric or antiferroelectric liquid crystal material, or a ferroelectric or antiferroelectric liquid crystal material containing a polymer compound; and 108, an insulating film for preventing short-circuiting between the electrodes.

FIG. 2 shows a configuration in which auxiliary capacitors 201 are added to the liquid crystal electro-optical device of FIG. 1.

As described later in section [2] onward, the invention is characterized in that a particular relationship exists between the spontaneous polarization of a liquid crystal material, pixel electrode area, pixel capacitance, application voltage (magnitude of a pulse voltage), width of the pulse voltage, etc.

Except for the above, the device of the invention may have the components ordinarily used. The thin-film transistors as the switching elements may be made of either crystalline or non-crystalline silicon.

The liquid crystal material may be uniaxially oriented by a conventional method. In addition to a rubbing method in which an orientation film of polyimide or the like formed on the substrate surface having the electrodes is rubbed with a cloth, an oblique deposition method and a temperature gradient method may be used.

In the invention, ferroelectric or antiferroelectric liquid crystals of any composition can be used as long as they satisfy formulae described below. However, in the case of antiferroelectric liquid crystal materials, which have a definite threshold voltage in contrast to ferroelectric liquid crystal materials, the application voltage should be kept somewhat higher so as to be always larger than the threshold voltage.

While the advantages of the invention can be obtained sufficiently with the use of the above liquid crystal material itself, the advantages can also be obtained with the above liquid crystal material containing a polymer resin (either set or non-set), a reaction initiator that is used in setting a polymer resin, or a reactive initiator that combines with a polymer resin after the reaction. Where the liquid crystal material contains a polymer resin, no specific limitation is imposed on the shape of the polymer resin. That is, the polymer resin may exist between the pair of substrates so as to assume a columnar shape, or exist on a part of or over the entire surface of the substrate that has been subjected to the orientation treatment.

[2] Formulae Representing Relationships Between the Application Voltage Waveform and the Configuration of the Liquid Crystal Electro-optical Device In the invention, after investigations as to the configuration of the liquid crystal electro-optical device and the application voltage waveform, devices capable of performing superior display with definite gradation levels and an increased number of gradations has been obtained by configurations that satisfy the following formulae. More specifically, in the invention, values of the components are obtained from the formulae for the following respective cases.

Case (1): A single pulse is applied as the gate pulse.

Case (2): In case (1), the charge quantity may become insufficient depending on the number of gradations, the liquid crystal material used and the cell configuration. Case (2) is intended to obtain superior display performance by supplementing the charge supply amount by connecting auxiliary capacitances to the respective pixel electrodes.

Case (3): In cases (1) and (2), there is a possibility that positive or negative pulses applied to the pixels become very dominant in number as a whole, to cause a situation close to a case where DC voltages are applied to the pixels. This will results in a deterioration of the liquid crystal. To prevent this problem, in case (3), a bipolar pulse is applied as the gate pulse.

Case (4): In case (3), the charge quantity may become insufficient depending on the number of gradations, the liquid crystal material used and the cell configuration. Case (4) is intended to obtain superior display performance by supplementing the charge supply amount by connecting auxiliary capacitances to the respective pixel electrodes.

In case (1), a liquid crystal electro-optical device comprises electrodes; a pair of substrates at least one of which is transparent; thin-film transistors provided on one of the pair of substrates; and a ferroelectric or antiferroelectric liquid crystal material, or a ferroelectric or antiferroelectric liquid crystal material mixed with a polymer compound held between the pair of substrates, wherein a formula $$C_{LC}\{V - V_{rem} - 2Ve^{-\frac{w}{\tau_{LC}}}\} \geq 2P_S S \quad (1)$$

holds.

In case (2), a liquid crystal electro-optical device comprises electrodes; a pair of substrates at least one of which is transparent; thin-film transistors provided on one of the pair of substrates; and a ferroelectric or antiferroelectric liquid crystal material, or a ferroelectric or antiferroelectric liquid crystal material mixed with a polymer compound held between the pair of substrates, wherein a formula $$C_{LC}\{V - V_{rem} - 2Ve^{-\frac{W}{\tau_{LC}}}\} + C_{AD}\{V - V_{rem} - 2Ve^{-\frac{W}{\tau}}\} \geq 2P_S S \quad (2)$$

holds.

In case (3), a liquid crystal electro-optical device comprises electrodes; a pair of substrates at least one of which is transparent; thin-film transistors provided on one of the pair of substrates; and a ferroelectric or antiferroelectric liquid crystal material, or a ferroelectric or antiferroelectric liquid crystal material mixed with a polymer compound held between the pair of substrates, wherein a formula $$C_{LC}\{V - V_{rem} - 3Ve^{-\frac{W}{\tau_{LC}}}\} \geq 2P_S S \quad (3)$$

holds.

In case (4), a liquid crystal electro-optical device comprises electrodes; a pair of substrates at least one of which is transparent; thin-film transistors provided on one of the pair of substrates; and a ferroelectric or antiferroelectric liquid crystal material, or a ferroelectric or antiferroelectric liquid crystal material mixed with a polymer compound held between the pair of substrates, wherein a formula $$C_{LC}\{V - V_{rem} - 3Ve^{-\frac{W}{\tau_{LC}}}\} + C_{AD}\{V - V_{rem} - 3Ve^{-\frac{W}{\tau}}\} \geq 2P_S S \quad (4)$$

holds.

In Formulae (1)–(4), Ps is spontaneous polarization of the ferroelectric liquid crystal or the antiferroelectric liquid crystal, $C_{LC}$ is a capacitance between the pixel electrode and the opposite electrode, $C_{AD}$ is a capacitance of an auxiliary capacitor connected with the capacitance $C_{LC}$, V is a magnitude of a pulse voltage applied to a gate of the transistor, W is a width of the pulse voltage, $\tau_{LC}$ is a time constant of a pixel comprising the pixel electrode etc, $\tau$ is a time constant of an auxiliary circuit, i.e., circuit elements that are equivalent to the auxiliary capacitor (time constant of a parallel connection of a capacitor corresponding to the auxiliary capacitor and a resistor), S is a pixel electrode area, and $V_{ren}$ is a residual voltage due to residual charge between the pixel electrode and the opposite electrode immediately before application of the next pulse.

The present inventors have found that the above configurations realize liquid crystal electro-optical devices having definite gradation levels and an increased number of gradations by providing light and dark states satisfactorily even with very quick light/dark switching, which is required in the gradation display method of controlling periods of light and dark states.

In the following, a description will be made of a specific device which is produced by injecting a ferroelectric liquid crystal material into a cell having a pixel electrode area of 2.5×10⁻⁵ m² (5 mm×5 mm) and a distance between pixel electrodes of 2.5 μm, and which is driven actively. More specifically, necessary spontaneous polarization of the liquid crystal material and a necessary application voltage waveform will be determined using the above-described formulae.

The liquid crystal cell is driven by an application pulse voltage having a magnitude of 15 V and a width of 1,000 ns. In the gradation display method of controlling periods of light and dark states, it is important that a brightness ratio between the lightest state and the darkest state, i.e., a contrast ratio obtained with application of a unit pulse during gradation display be equivalent to a contrast ratio obtained in an operation state (for instance, the width of the application pulse voltage is 1 sec) very close to the static operation state. It is assumed that in the above gradation display method the residual voltage $V_{ren}$ for providing a sufficiently large contrast ratio is 9 V, and that $C_{LC}$ and $\tau_{LC}$ have measured values of 347 pF and 266 ns, respectively.

It may be conceivable that $C_{LC}$ and $\tau_{LC}$ vary with the material. However, according to the inventors' investigation as to the dependence of the above parameters on the spontaneous polarization using various ferroelectric liquid crystal materials having different magnitudes of spontaneous polarization, $C_{LC}$ of any material was about 340 pF and $\tau_{LC}$ was about 260 ns.

In the case of applying a single pulse, according to Formula (1), superior gradation display can be obtained if the spontaneous polarization $P_S$ of the liquid crystal is not larger than 30 nC/cm².

Where a single pulse is applied and auxiliary capacitors are used, according to Formula (2), satisfactory results are obtained by adding capacitors of 600 pF under the above conditions if the spontaneous polarization is not larger than 8.4 nC/cm².

More specifically, in cases (1) and (2), the liquid crystal can be prevented from deteriorating by using a negative-to-positive or positive-to-negative bipolar pulse (see FIG. 3b) instead of a positive or negative single pulse (see FIG. 3a). Because of the necessity of inversion between positive and negative polarities, the use of a bipolar pulse is somewhat disadvantageous in terms of charge supply (time constant) particularly in high-speed driving. However, various evaluations may be made according to Formulae (1)–(4), and no change is required in the other points.

While the spontaneous polarization should be not larger than 8.4 nC/cm² (with the auxiliary capacitors of 600 pF) under the above conditions when a single pulse is used, it should be not larger than 8.2 nC/cm² according to Formula (4) that is directed to the case of using a bipolar pulse. Conversely, an optimum capacitance can be obtained by solving Formulae (2) or (4) with the spontaneous polarization and auxiliary capacitance regarded as know and unknown values, respectively. For example, to operate the liquid crystal device having spontaneous polarization of 10 nC/cm² by using a single pulse under the above conditions, it is determined from Formula (4) that the auxiliary capacitance should be 750 pF. In this manner, optimum values of the spontaneous polarization and auxiliary capacitance are determined.

In Formulae (1)–(4), $V_{ren}$ is related to a voltage retaining factor that is used to evaluate a liquid crystal device. Therefore, in the case of a liquid crystal device whose voltage retaining factor and time constant are known, an upper limit of the spontaneous polarization and an optimum value of the auxiliary capacitance can be evaluated by determining $V_{ren}$ by, for instance, a numerical calculation, and substituting the calculated value of $V_{ren}$ into Formula (1), (2), (3) or (4). The voltage retaining factor will be described with reference to FIGS. 4 and 5.

In a liquid crystal electro-optical device using TFTs, a liquid crystal pixel 404 is connected to a TFT that is composed of a source 401, a drain 402 and a gate 403 (see FIG. 4). A data signal supplied to the source 401 via a supply terminal 405 is sent to the drain side in accordance with a voltage applied to the gate 403, so that charge is supplied to a pixel electrode. While the gate 403 is in an off state, in which case the channel between the source 401 and the drain 402 has a high resistance, charge does not flow into or out of the pixel.

FIG. 5 shows signals applied to the respective terminals and the pixel. A data signal in the form of, for instance, a rectangular wave 504 is applied between the source 401 and the drain 402, and sent to the drain side as a voltage 505 only when the gate electrode 403 is in an on state. If the pixel is regarded as an ideal capacitor, charge stored in the pixel capacitor produces a voltage 502. However, an attenuated voltage 503 actually appears. The voltage retaining factor is defined as a ratio of an effective voltage actually applied to the liquid crystal to that of the ideal case.

That is, the voltage retaining factor is defined as $$H_r = \frac{1}{V} \sqrt{\frac{2}{T} \int_0^{\frac{T}{2}} V_h^2 \, dt} \tag{5}$$

where $V_h$ is a time-variant retained voltage, which is approximated using a resistance component that is an inverse of the pixel leak conductance and a time constant $\tau_v$ of the pixel capacitance and the auxiliary capacitance as $$V_h = (V - V_{rem}) e^{-\frac{t}{\tau_v}} + V_{rem} \tag{6}$$

where V is the applied signal voltage, T is a period of a single positive/negative inversion of a pulse, and $V_{ren}$ is the residual voltage.

From Equations (5) and (6), a relationship between the retaining factor $H_r$ and $V_{ren}$ is obtained as $$AV_{rem}^2 + 2BV_{rem} = V^2\{H_r^2 T - \tau_v(1 - e^{-\frac{T}{\tau_v}})\} \tag{7}$$

where $$A = T + \tau_v(4e^{-\frac{T}{2\tau_v}} - e^{-\frac{T}{\tau_v}} - 3) \tag{9}$$

$$A = \tau_v V(1 - 2e^{-\frac{T}{2\tau_v}} + e^{-\frac{T}{\tau_v}}). \tag{10}$$

Apparently, where the spontaneous polarization of the liquid crystal is small, or discharging of a pixel is little, the auxiliary capacitances can be omitted. In particular, excessively large auxiliary capacitances are not desirable in practicing the invention, because they may cause an unduly long charging or discharging time. To reduce discharging of a pixel, it is necessary, for instance, to make the off-resistance of a thin-film transistor sufficiently large to thereby reduce a leak current, and to make the resistance between electrodes of the pixel itself sufficiently large. In particular, to attain the latter object, it is effective to coat the pixel electrode with an insulative material such as silicon nitride, silicon dioxide, tantalum oxide, or aluminum oxide. Increasing the capacitance of the pixel itself is also effective to reduce its discharging. This can be done, for instance, by increasing the dielectric constant of the liquid crystal or decreasing the interval between the substrates. In applying Formula (1) or (3), it is preferable that the relative dielectric constant be not less than 6. In applying Formula (2) or (4), it is preferable that it is not less than 4.

[3] Example of Driving

In practicing the invention, for example, there may be constructed a matrix circuit using thin-film transistors as shown in FIG. 6, which is the same as the circuit used in the conventional active-matrix type display device using TFTs.

In the above type of circuit, a voltage applied to each pixel can be on/off-controlled by controlling a gate voltage and a source-drain voltage of the corresponding thin-film transistor. In this example, the matrix consists of 640×480 dots, but only a small portion including an intersection of the mth row and the nth column is shown to avoid complexity. A complete matrix is obtained by arranging the same units repeatedly in all of the four directions around the portion shown in FIG. 6. FIG. 7 shows an example of an operation with the use of the circuit of FIG. 6. FIG. 7 is directed to a single pixel.

A signal line (scanning line) $X_n$ is connected to gate electrodes of respective TFTs. Rectangular pulses are applied to the signal line $X_n$ as shown in FIG. 7. On the other hand, a signal line (data line) $Y_n$ is connected to source (or drain) electrodes of the respective TFTs, and pulses indicating a positive or negative state are applied to the signal line $Y_n$. In the case of the 480-row matrix, 480 pieces of information per unit time $T_0$ are included in those pulses. The invention is characterized in that one frame consists of a plurality of (5 in the example of FIG. 7) subframes.

To simplify the description, it is assumed that the voltage of the opposite substrate is fixed at 0 V. As shown in FIG. 7, since $V_D$ is positive when $V_0$ is first applied, a voltage $V_{LC}$ of the pixel is positive. As shown in FIG. 7, $V_{LC}$ drops by $\Delta V$ at this time, and then gradually decreases to 0 by natural discharge. In spite of the decrease of the pixel voltage $V_{LC}$, a transmittance Tnc of the pixel is kept at a constant value because charge enough to render the liquid crystal transparent is retained.

In designing the device, $V_C$ and $V_D$ may be set for a TFT having worst characteristics. For example, $V_D$ is so set that $V_{LC}$ becomes larger than +9 V, preferably larger than +11 V, at a time point immediately after a longest subframe period of $16T_0$ in FIG. 7. $V_G$ is set at a value that is appropriate for driving of $V_D$.

Although in FIG. 7 the waveform of the voltage $V_{LC}$ is so drawn as to drop by the same amount in each subframe, it is noted that $V_{LC}$ drops more when the subframe period is longer.

The second pulse of $V_C$ is applied after a lapse of $T_0$ from the application of the first pulse. Since the data signal $V_D$ is positive at this time, the pixel voltage $V_{LC}$ is kept positive. However, $V_{LC}$ is increased by new charge injection. No change occurs in the pixel transmittance $T_{LC}$.

Since the data signal $V_D$ is negative when the third pulse of $V_G$ is applied after a lapse of $16T_0$, the pixel voltage $V_{LC}$ is reversed to become negative and the transmittance $T_{LC}$ changes accordingly. Since this transition is relatively gentle, a time of about 50 μsec is needed if the applied voltage is smaller than 10 V. Although in contrast the width of the pulse $V_G$ is smaller than 30 μsec, this causes no problem because in this liquid crystal a transition in the optical response occurs in accordance with the pixel voltage $V_{LC}$ rather than the pulse $V_G$.

Since the data signal $V_D$ is negative when the fourth pulse of $V_G$ is applied after a lapse of $2T_0$, the polarity of the pixel voltage Vnc does not change. Since the data signal $V_D$ is positive when the fifth pulse of $V_G$ is applied after a lapse of $8T_0$, the pixel voltage $V_{LC}$ turns positive and the pixel transmittance $T_{LC}$ also changes. The one-frame operation finishes when the first pulse of $V_C$ of the next frame is applied after a lapse of $4T_0$. It is possible to provide display of 32 gradation levels by properly combining the five subframes. In the above operation, a brightness level (gradation level) of 21=1+16+4 is obtained.

In the above operation, it is important to set the minimum time unit $T_0$ at an optimum value. As already described above, the optical response time (the time required to change from a dark state to a light state, or vice versa) of a ferroelectric (or antiferroelectric) liquid crystal depends on the application voltage. For example, if the voltage applied to the pixel is about 15 V, the response time is 50 μsec. In general, the optical response time is inversely proportional to the application voltage. On the other hand, to provide display performance suitable for moving images and prevent a flicker, the one-frame period should be shorter than 100 msec, preferably shorter than 30 msec. For example, if the one-frame period is 30 msec, the maximum number of gradations is 600=(30 msec)/(50 psec). However, since a time several times longer than the above optical response is required to assure a complete optical response, the number of gradations is reduced to about 100. This limitation can be relaxed by increasing the voltage (or electric field) applied to the liquid crystal to thereby shorten the optical response time. However, the breakdown voltage of TFTs needs to be increased accordingly.

The liquid crystal electro-optical device using a ferroelectric liquid crystal operates on the driving principle that liquid crystal molecules are switched by torque that is generated by the interaction between the spontaneous polarization of the liquid crystal material and the external electric field. Therefore, to drive a ferroelectric or antiferroelectric liquid crystal, a sufficient amount of charge needs to be supplied between the electrodes to form an electric field strong enough to reverse the spontaneous polarization of the liquid crystal material. If an external voltage is continuously applied to the liquid crystal material, charge is always supplied to the electrode. Therefore, the voltage between the electrodes is kept the same as the voltage of an external power supply even when liquid crystal molecules react to the electric field to reverse the spontaneous polarization and the charge is consumed by a current flowing between the electrodes.

However, in the TFT driving, which is the case of the invention, charge is supplied to the electrode only while a pulse is applied to the gate of a TFT. Therefore, after the TFT is turned off, in which case the electrode is in a floating state, power consumption associated with the reversal of the spontaneous polarization is effected only between the electrodes.

The response speed of even a fast-response type ferroelectric or antiferroelectric liquid crystal is several microseconds. If the pulse width should be, for instance, 1 μsec to provide finer gradations, the reversal of liquid crystal molecules occurs while the TFT is in an off state.

Therefore, where the response time of the liquid crystal is sufficiently longer than the pulse width, that is, where most of liquid crystal molecules are reversed while the TFT is in an off state, a sufficient amount of charge to reverse the spontaneous polarization needs to be supplied while the TFT is in an on state.

In the case of a ferroelectric or antiferroelectric liquid crystal having large spontaneous polarization, the amount of charge required for the reversal is large and, accordingly, the amount of charge to be supplied to the electrode is large.

Further, there exist a series resistance component in the pixel electrode and a leak conductance component between the electrodes. The larger these components are, the longer time is needed for the charge supply. Specifically, an RC time constant of a resistance component and a capacitance component between the electrodes needs to be taken into consideration as a parameter for characterizing the charging time.

If the pulse width is short for the time constant, the amount of charge supplied for the reversal of the spontaneous polarization becomes insufficient to cause problems such as an incomplete optical response.

If a voltage larger than a predetermined voltage is not retained between the electrodes in a floating state until the next pulse is applied, liquid crystal molecules once reversed are returned to their original states, which is another factor of deteriorating the optical characteristics.

As a matter of fact, in performing the above-described gradation display in the liquid crystal electro-optical device using a ferroelectric or antiferroelectric liquid crystal, the optical characteristics largely depend on the characteristics of the liquid crystal material itself. In particular, it is necessary to evaluate the magnitude of the spontaneous polarization of the liquid crystal material and the auxiliary capacitance.

In the display device according to the invention, since the relationship between the spontaneous polarization of a liquid crystal material, the pixel shape and the application voltage waveform is specified, liquid crystal molecules can respond at high speed in a definite manner even where the pulse width is shorter than the response time of a ferroelectric or antiferroelectric liquid crystal material or a material produced by dispersing a ferroelectric or antiferroelectric liquid crystal in a polymer compound.

Where a liquid crystal material having spontaneous polarization is driven by cells having TFTs, the supplied charge quantity becomes smaller compared to the charge quantity required for the reversal of the spontaneous polarization as the width of the application pulse becomes shorter. The invention solves this problem by adding the auxiliary capacitors to compensate the charge quantity that is rendered insufficient to reverse the spontaneous polarization of the liquid crystal material due to the short pulse width, and to compensate the charge quantity that is rendered insufficient due to the discharge. It is effective to provide the auxiliary capacitors on the substrate having the TFTs.

BRIEF DESCRIPTION OF THE DRAWINGS

FIGS. 3a and 3b–d show polarity of applied pulses;

DESCRIPTION OF THE PREFERRED EMBODIMENTS

Figure 1:
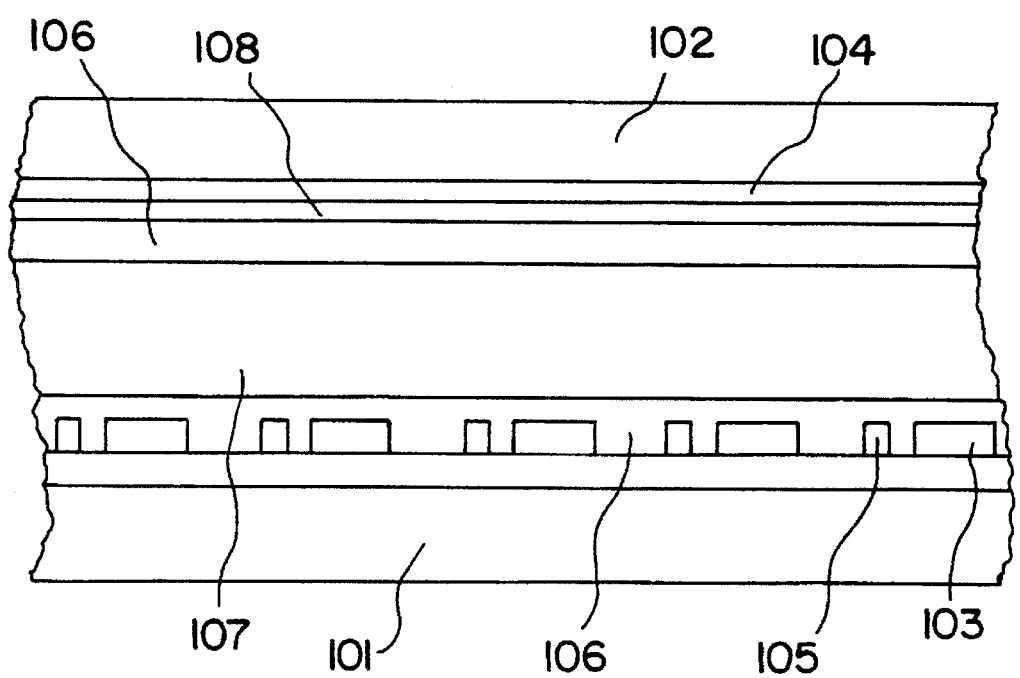
FIG. 1 is a schematic view of a liquid crystal electro-optical device according to a third embodiment of the present invention.

The present invention will be hereinafter described by way of embodiments of liquid crystal electro-optical devices to which the invention is applied.

Embodiment 1

[1] Allowable spontaneous polarization

In this embodiment, a relationship between the magnitude of the spontaneous polarization and the display characteristics was determined from the theoretical formula described above, and display characteristics were checked by actually producing a cell.

Where a liquid crystal material is driven under conditions that the application voltage is 15 V, the residual voltage is 9 V, and the pulse width is 150 ns, and a cell having a pixel capacitance of 360 pF is used, it has been found from Formula (2) that satisfactory driving can be obtained as long as the spontaneous polarization is smaller than 6 nC/cm$^2$ if auxiliary capacitors of 600 pF are provided.

To confirm the above result, a cell for evaluation was actually produced and checked. The cell for evaluation was such that the pixel electrode area was 2.5×10$^{-5}$ m$^2$ (5 mm×5 mm), and that the distance between the pixel electrode and the opposite electrode, i.e., the distance between the pixel electrodes was 2.5 μm. Further, a polyimide orientation film that had been subjected to a uniaxial orientation treatment was formed on the electrode surface. Phenylpyrimidine type ferroelectric liquid crystals (materials A, B and C) were injected into the above cells by a conventional method, to provide cells for evaluation. The pixel capacitance was about 360 pF in each cell.

Table 1 shows a relationship between the spontaneous polarization and the display performance of each cell. In driving the cell, a capacitor of 600 pF as the auxiliary capacitors was connected in parallel to the cell. The application voltage and the pulse width were set at 15 V and ns, respectively. The residual voltage was about 9 V after a lapse of 3 msec.

TABLE 1

| Liquid crystal material | Spontaneous polarization (nC/cm$^2$) | Pixel capacitance (pF) | Display performance |
|---|---|---|---|
| A | 4 | 360 | Good |
| B | 6 | ↑ | Good |
| C | 10 | ↑ | Not good |

Among those cells, the cells of $P_S$=4 and 10 nC/cm$^2$, respectively were subjected to optical response measurements with the pulse width varied. The cell of $P_S$=10 did not show a satisfactory response when the pulse width was shorter than ns. On the other hand, the cell of $P_S$=4 showed a response having a sufficiently high contrast and good display performance even in high-speed driving in which the pulse width is as short as 140 ns.

Embodiment 2

[2] Allowable pulse width

In this embodiment, a theoretical value and a measured value of the pulse width allowable in actual driving were compared with each other. With the pixel capacitance of 347 pF, optimum auxiliary capacitances when a single pulse and a bipolar pulse are applied were calculated as 600 pF according to Formulae (2) and (4).

A cell for evaluation was prepared by injecting a naphthalene type ferroelectric liquid crystal of $P_S$=4 nC/cm$^2$ into the cell of the first embodiment by a conventional method. The pixel capacitance of the cell was 347 pF. Table 2 shows a relationship between the pulse width, the optimum auxiliary capacitance and the display performance obtained when the cell was driven by a single or bipolar pulse with addition of a capacitor of 600 pF.

TABLE 2

| Pulse type | Optimum auxiliary capacitance (pF) | Pulse width (ns) | Display performance |
|---|---|---|---|
| Single | 600 | ≧140 | Good |
|  |  | <140 | Not good |
| Bipolar | 600 | ≧190 | Good |
|  |  | <190 | Not good |

When the cell was actually driven with the addition of the capacitor of 600 pF, a response of almost complete switching between light and dark states was obtained with the pulse width not shorter than 140 ns in the case of a single pulse, and with the pulse width not shorter than 190 ns in the case of a bipolar pulse. Under the above conditions, good display performance was obtained.

Embodiment 3

[3] Manufacture of liquid crystal electro-optical device

FIG. 1 shows a configuration of a liquid crystal electro-optical device manufactured according to this embodiment. An active matrix using crystalline silicon TFTs 105 formed on a non-alkali glass substrate was produced on one substrate 101 of a cell. Auxiliary capacitors were not provided in the circuit formed on the active matrix substrate. A single-gate PMOS TFT was used, because it has a small leak current and, therefore, can provide a large on/off ratio. Typically, the leak current was smaller than 1 pA (gate voltage: +15 V; drain voltage: −10 V) and the on/off ratio was more than 7.5 digits (gate voltage: −15 V/+15 V; drain voltage: −10 V).

An ITO film as an opposite electrode 104 was formed over the entire surface of the other substrate 102, and a silicon dioxide film 108 for preventing short circuiting was formed on the ITO film. A pixel electrode 103 had a size of 20 gm×60 gm, and the matrix size was 1,920×480 dots.

In this embodiment, the pulse width and height of a scanning signal applied to the matrix was made 1 μsec and −15 V, respectively, and a data signal was made ±15 V.

Then, a polymer resin dissolved in a solvent was applied to the above-described substrate by spin coating to produce an orientation film 106. The polymer resin was a polyimide type resin (manufactured by Toray Industries, Inc.), and the solvent was n-methyl-2-pyrolidone. The polymer resin was diluted at a ratio of 8. The substrate coated with the polymer resin was heated at 280° C. for 2.5 hours to dry the solvent and cause the imidization. Then, the resin on the substrate was rubbed in one direction with a croth, such as a velvet, wound on a roller rotating at 1,000 rpm. The two substrates were combined while being pressed against each other, with an inorganic spacer of 1–7 μm in thickness interposed in between. A liquid crystal material 107 was injected into a space between the two substrates.

A description will be made of the selection of a liquid crystal material suitable for the above configuration. With the above pixel configuration, if a liquid crystal material similar to those used in the first and second embodiments is injected, it is expected that the pixel capacitance becomes $2.7 \times 10^{-5}$ pF and the pixel time constant becomes 0.020 ns.

It has been confirmed experimentally that where a liquid crystal material similar to those of the first and second embodiments is used, the liquid crystal material performs uniform on/off switching in each pixel if a voltage not smaller than 9 V is applied between the pixel electrodes. Therefore, also in this embodiment, the residual voltage is assumed to be 9 V.

By substituting the above values into Formula (1), it becomes apparent that a liquid crystal whose spontaneous polarization is not larger than 6.75 nC/cm$^2$ can be driven. Based on this conclusion, there was used a liquid crystal material whose spontaneous polarization satisfies the above condition, and which provides superior orientation performance.

A description will be made of the liquid crystal material thus selected. The liquid crystal material used in this embodiment is a ferroelectric liquid crystal CS-1014 manufactured by Chisso Corp. This liquid crystal has a phase series of Iso-N*-SmA-SmC*-Cry. Transition temperatures of Iso—N*, N*-SmA, SmA-SmC* and SmC*-Cry were 81° C., 69° C., 54° C. and −21° C., respectively. The thickness of the liquid crystal cell was made 1.6 µm. The spontaneous polarization of the liquid crystal was 5 nC/cm$^2$.

When the voltage applied to the liquid crystal was lower than 5 V, a domain structure was observed in the liquid crystal. Since the domain structure deteriorates performance of the digital gradation display, it is desirable to set the application voltage higher to avoid the occurrence of a domain structure.

Further, in the liquid crystal electro-optical device of this embodiment, the dependence of the contrast ratio on the data signal application time was checked. It has been confirmed that a complete response is obtained even with a pulse width of 1 µsec, and that the spontaneous polarization value calculated according to the above formula is effective.

Figure 7:
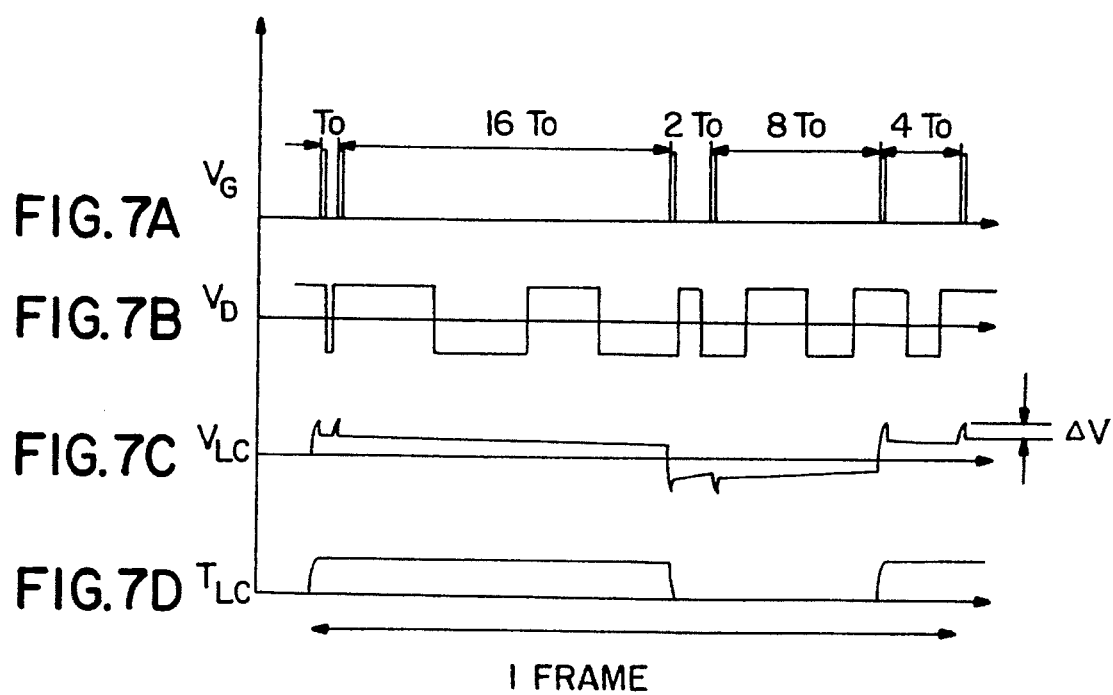
FIG. 7a–d shows waveforms of driving voltages in the invention.

Using the above liquid crystal electro-optical device, digital gradation display by switching between light and dark states was conducted. More specifically, one frame was constituted of 5 subframes as shown in FIG. 7, and digital gradation display of 32 gradations was performed. The periods of the first to fifth subframes were set at 179 µsec, 2.87 msec, 358 µsec, 1.43 msec, and 717 µsec, respectively. The one frame period was set at 5.5 msec, which corresponds to 180 Hz.

As a result, the above liquid crystal electro-optical device produced a display having 32 gradations and a maximum contrast ratio of 40. Gradation levels were very definite.

Another liquid crystal electro-optical device was manufactured which was the same as the above device except that a liquid crystal material had a spontaneous polarization value of 8 nC/cm$^2$, and display was performed in the similar manner. Thirty-two gradation levels were very indefinite; that is, no substantial gradation display was obtained.

Embodiment 4

Figure 2:
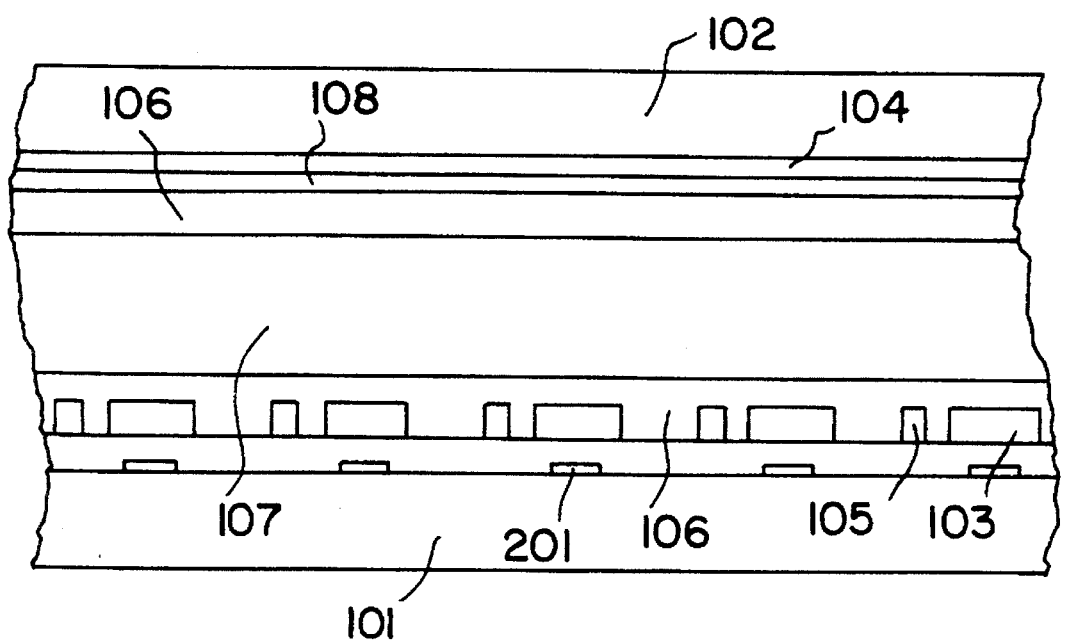
FIG. 2 is a schematic view of a liquid crystal electro-optical device according to a fourth embodiment of the invention.
Figure 4:
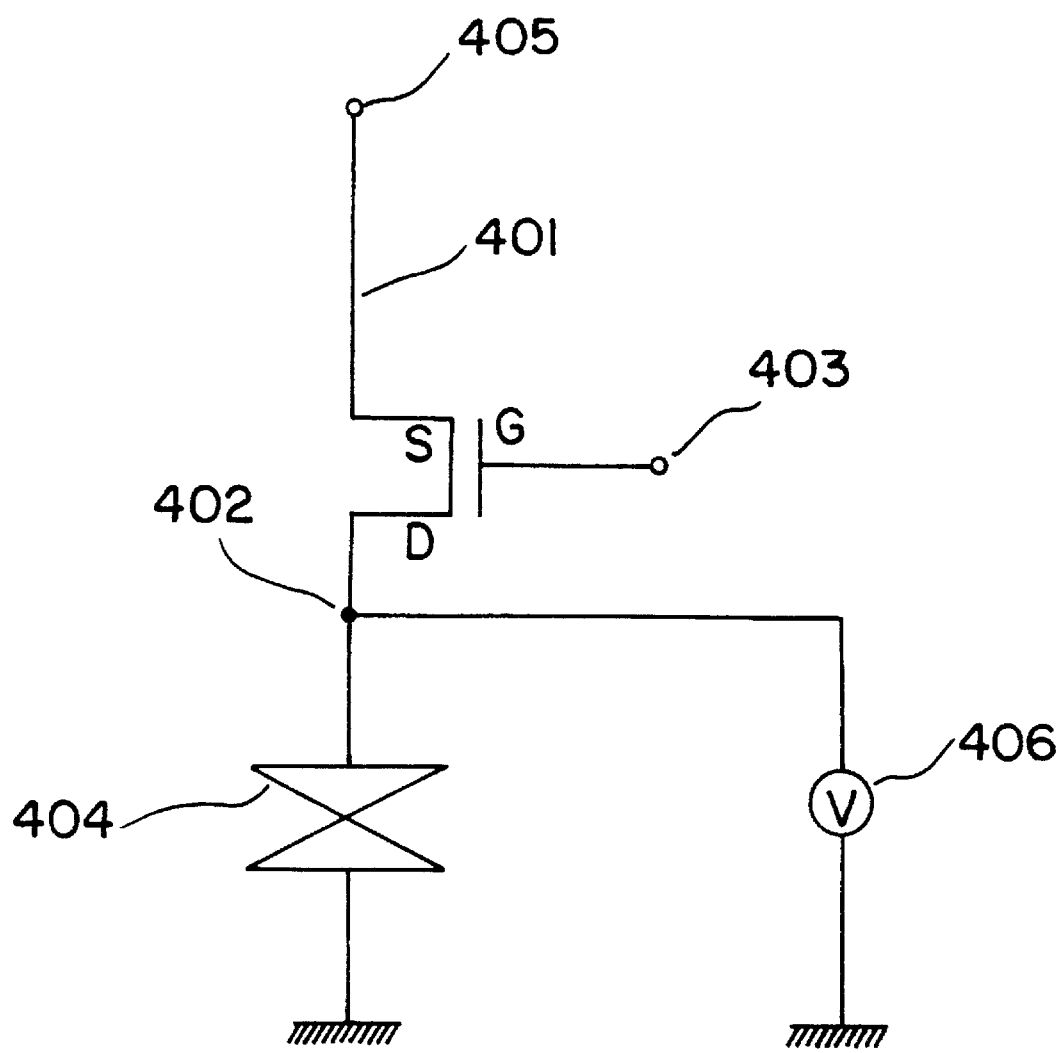
FIG. 4 shows a circuit for measuring a voltage retaining factor.
Figure 5:
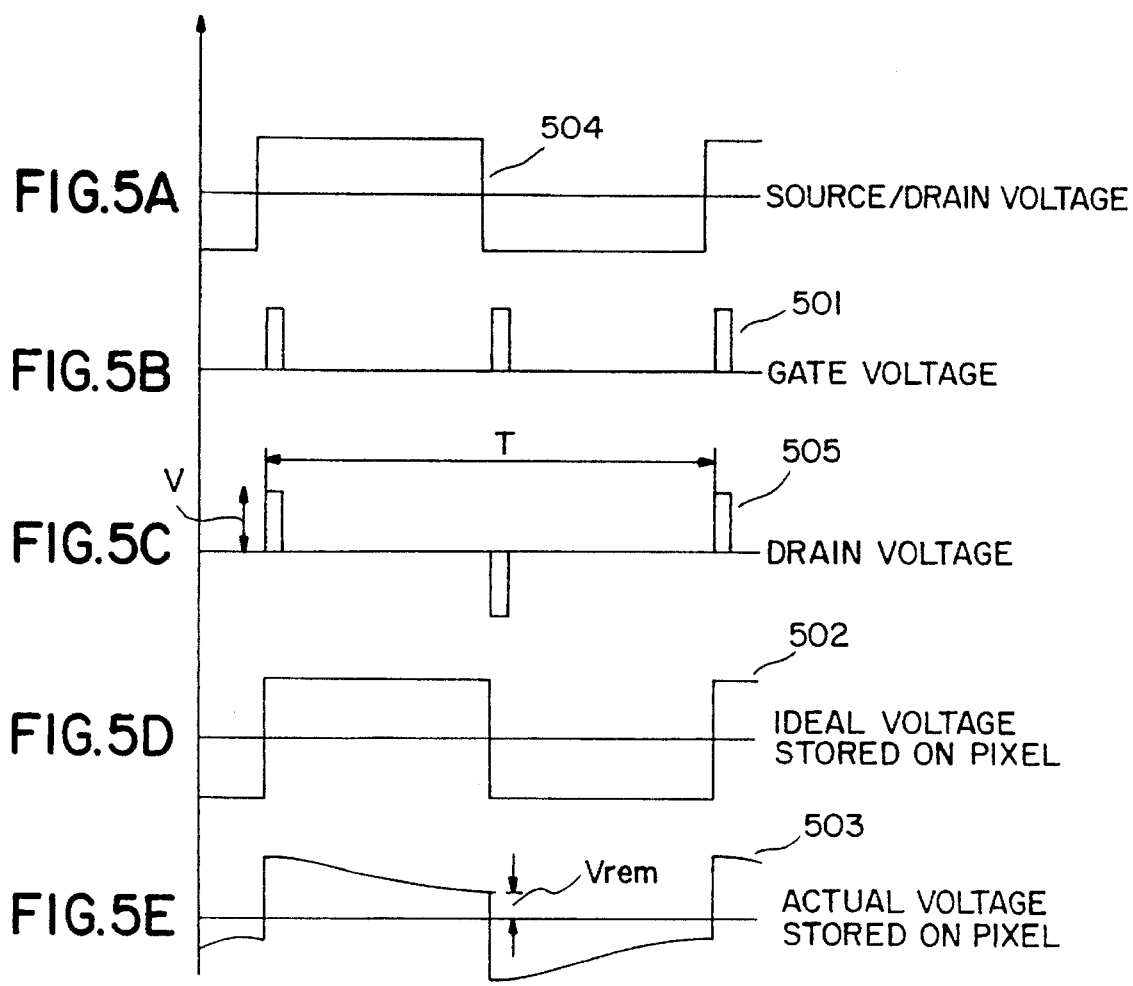
FIG. 5a–e shows applied pulses and a resulting voltage across a pixel.
Figure 6:
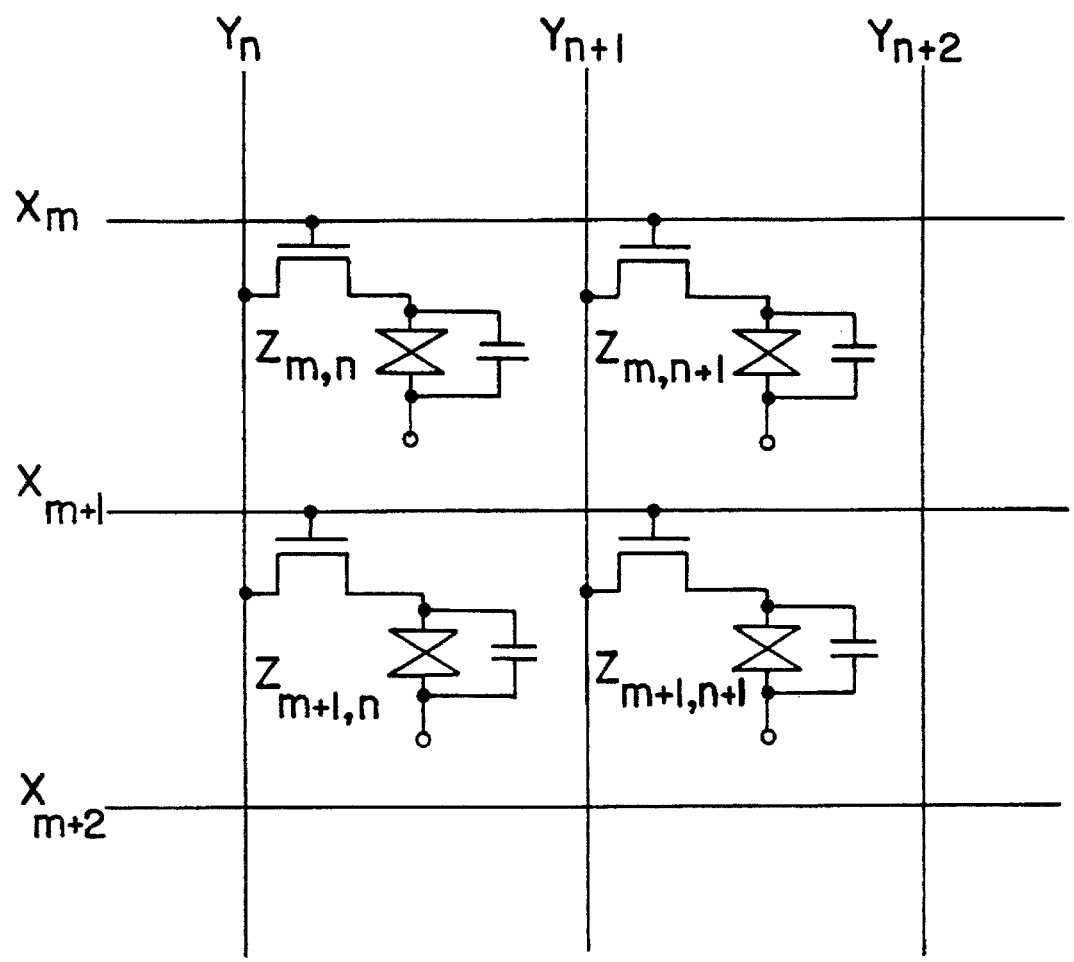
FIG. 6 shows a matrix circuit of a liquid crystal electro-optical device.

FIG. 2 shows a configuration of a liquid crystal electro-optical device manufactured according to this embodiment. An active matrix using crystalline silicon TFTs 105 formed on a non-alkali glass substrate was produced on one substrate 101 of a cell. Since this embodiment employed a liquid crystal having large spontaneous polarization as described below, auxiliary capacitors were provided in the circuit formed on the active matrix substrate, as shown in FIG. 6. As shown in FIG. 2, the auxiliary capacitors 201 of $5.4 \times 10^{-5}$ pF were provided on the substrate 101 in parallel with the pixel capacitances. A single-gate PMOS TFT was used, because it has a small leak current and, therefore, can provide a large on/off ratio. Typically, the leak current was smaller than 1 pA (gate voltage: +15 V; drain voltage: −10 V) and the on/off ratio was more than 7.5 digits (gate voltage: −15 V/+15 V; drain voltage: −10 V).

An ITO film as an opposite electrode 104 was formed over the entire surface of the other substrate 102, and a silicon dioxide film 108 for preventing short circuiting was formed on the ITO film. A pixel electrode 103 had a size of 20 µm×60 µm, and the matrix size was 1,920×480 dots.

In this embodiment, the pulse width and height of a scanning signal applied to the matrix was made 1 µsec and −15 V, respectively, and a data signal was made ±15 V.

Then, a polymer resin dissolved in a solvent was applied to the above-described substrate by spin coating to produce an orientation film 106. The polymer resin was a polyimide type resin (manufactured by Toray Industries, Inc.), and the solvent was n-methyl-2-pyrolidone. The polymer resin was diluted at a ratio of 8. The substrate coated with the polymer resin was heated at 280° C. for 2.5 hours to dry the solvent and cause the imidization. Then, the resin on the substrate was rubbed in one direction with a cloth, such as a velvet, wound on a roller rotating at 1,000 rpm. The two substrates were combined while being pressed against each other, with an inorganic spacer of 1–7 µm in thickness interposed in between. A liquid crystal material 107 was injected into a space between the two substrates.

A description will be made of the selection of a liquid crystal material suitable for the above configuration. With the above pixel configuration, if a liquid crystal material similar to those used in the first and second embodiments is injected, it is expected that the pixel capacitance becomes $2.7 \times 10^{-5}$ pF and the pixel time constant becomes 0.020 ns.

It has been confirmed experimentally that where a liquid crystal material similar to those of the first and second embodiments is used, the liquid crystal material performs uniform on/off switching in each pixel if a voltage not smaller than 9 V is applied between the pixel electrodes. Therefore, also in this embodiment, the residual voltage is assumed to be 9 V.

The auxiliary capacitors 201 used in this embodiment had a time constant of 54 ns. By substituting the above values into Formula (2), it becomes apparent that a liquid crystal whose spontaneous polarization is not larger than 20 nC/cm$^2$ can be driven. Based on this conclusion, there was used a liquid crystal material whose spontaneous polarization satisfies the above condition, and which provides superior orientation performance.

A description will be made of the liquid crystal material thus selected. The liquid crystal material used in this embodiment is a phenylpyrimidine type ferroelectric liquid crystal. This liquid crystal has a phase series of Iso-SmA—SmC*-Cry. Transition temperatures of Iso-SmA, SmA-SmC* and SmC*-Cry were 71.7° C., 46.3° C. and −9.7° C., respectively. The spontaneous polarization of the liquid crystal was 18 nC/cm$^2$. The thickness of the liquid crystal cell was made 2.5 µm.

When the voltage applied to the liquid crystal was lower than 5 V, a domain structure was observed in the liquid crystal. Since the domain structure deteriorates performance of the digital gradation display, it is desirable to set the application voltage higher to avoid the occurrence of a domain structure.

Figure 8:
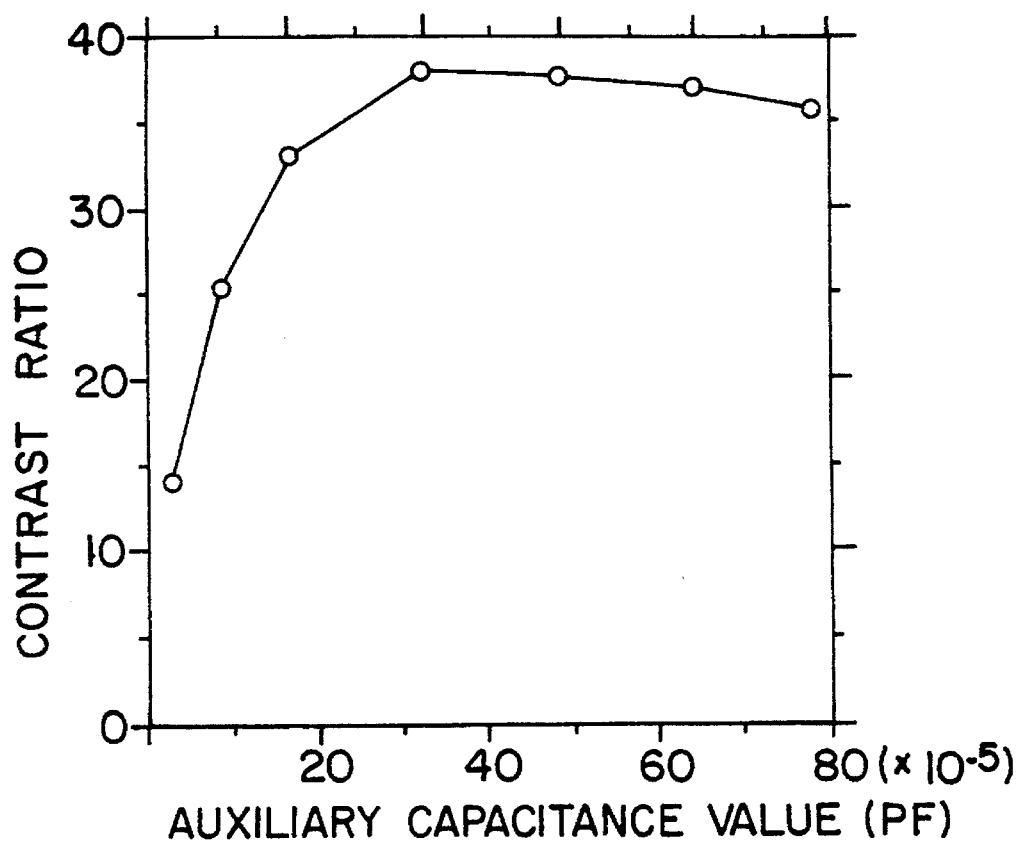
FIG. 8 is a graph showing a dependence of the contrast ratio on the auxiliary capacitance.

Further, in the liquid crystal electro-optical device of this embodiment, the dependence of the contrast ratio on the auxiliary capacitance was checked with the data signal application time fixed at 1 μsec. A result is shown in FIG. 8. It has been confirmed that as seen from FIG. 8, a complete response is obtained even with a liquid crystal material having large spontaneous polarization by using auxiliary capacitances of $30–60 \times 10^{-5}$ pF, and that the spontaneous polarization value calculated according to the above formula is effective.

Further, if the auxiliary capacitance is too large, an unduly long time is required to inject charge into the pixel electrode, resulting in a reduced contrast. Thus, it has been found that the auxiliary capacitance has an optimum value.

Using the above liquid crystal electro-optical device, digital gradation display was conducted. More specifically, one frame was constituted of 5 subframes as shown in FIG. 7, and digital gradation display of 32 gradations was performed. The periods of the first to fifth subframes were set at 179 μsec, 2.87 msec, 358 μsec, 1.43 msec, and 717 μsec, respectively. The one frame period was set at 5.5 msec, which corresponds to 180 Hz.

As a result, the above liquid crystal electro-optical device produced a display having 32 gradations and a maximum contrast ratio of 40.

Another liquid crystal electro-optical device was manufactured which was the same as the above device except that a liquid crystal material had a spontaneous polarization value of 22 nC/cm$^2$, and display was performed in the similar manner. Thirty-two gradation levels were very indefinite; that is, no substantial gradation display was obtained.

As described above, by making the liquid crystal electro-optical device have the configuration with the relationship represented by Formula (1), (2), (3) or (4), definite optical switching can be fully obtained even in highspeed driving, and very definite gradation display having a large number of gradation levels can be obtained in the gradation display method of controlling the periods of light and dark states.

Where a liquid crystal material having spontaneous polarization is driven by a cell having TFTs, the supplied charge quantity becomes smaller compared with the charge quantity necessary for reversal of the spontaneous polarization as the width of the application pulse becomes shorter. The invention solves this problem by employing the auxiliary capacitors provided in parallel with the pixel capacitances.

In the invention, optimum values of the auxiliary capacitance and the spontaneous polarization, which have not been investigated in detail conventionally, have been evaluated in connection with the time constant of capacitance and resistance components inherent in a liquid crystal pixel, the voltage retaining factor, the kind of pulse, and other parameters. As a result, the high-performance liquid crystal display capable of displaying images with a large number of gradations has been realized which fully utilizes advantages of a ferroelectric liquid crystal, i.e., a high-speed response, a high contrast ratio and a large angle of visibility by virtue of the high-speed driving method in which a liquid crystal material is driven under as preferable conditions as possible.

What is claimed is:

1. An electro-optical device comprising:

a pair of substrates;

a transistor provided on one of the pair of substrates;

a pixel electrode provided on the one of the pair of substrates and connected with one of source and drain of the transistor;

another electrode provided on the other of the pair of substrates; and an electro-optical modulating layer provided between the pair of substrates, the electro-optical modulating layer comprising a material selected from the group consisting of a ferroelectric liquid crystal, an antiferroelectric liquid crystal and a mixture thereof with a polymer, wherein a formula $$C_{LC}\{V-V_{rem}-2V\exp(-W/\tau_{LC})\} > 2\,P_s\,S$$

holds where $P_S$ is spontaneous polarization of the ferroelectric liquid crystal or the antiferroelectric liquid crystal, $C_{LC}$ is a capacitance between the pixel electrode and the another electrode, V is a magnitude of a pulse voltage applied to a the pixel electrode, W is a width of the pulse voltage $\tau_{LC}$ is a time constant of a pixel comprising the pixel electrode, S is an area of the pixel electrode, and $V_{rem}$ is a residual voltage due to residual charge between the pixel electrode and the another electrode immediately before application of a next pulse.

2. The device of claim 1 wherein the electro-optical modulating layer comprises the mixture, and the polymer has a columnar shape between the pair of substrates.

3. The device of claim 1 wherein the electro-optical modulating layer comprises the ferroelectric liquid crystal and the ferroelectric liquid crystal has a relative dielectric constant of 6 or more.

4. The device of claim 1 wherein the electro-optical modulating layer comprises the antiferroelectric liquid crystal and the antiferroelectric liquid crystal has a relative dielectric constant of 6 or more.

5. The device of claim 1 wherein the electro-optical modulating layer comprises the ferroelectric liquid crystal and the width W is shorter than a response time of the ferroelectric liquid crystal.

6. The device of claim 1 wherein the electro-optical modulating layer comprises the antiferroelectric liquid crystal and the width W is shorter than a response time of the antiferroelectric liquid crystal.

7. An electro-optical device comprising:

a pair of substrates;

a transistor provided on one of the pair of substrates;

a pixel electrode provided on the one of the pair of substrates and connected with one of source and drain of the transistor;

another electrode provided on the other of the pair of substrates; and an electro-optical modulating layer provided between the pair of substrates, the electro-optical modulating layer comprising a material selected from the group consisting of a ferroelectric liquid crystal, an antiferroelectric liquid crystal and a mixture thereof with a polymer, wherein a formula $$C_{LC}\{V-V_{rem}-2V\exp(-W/\tau_{LC})\}+C_{AD}\{V-V_{rem}-2V\exp(-W/\tau)\} \geq 2\,P_s\,S$$

holds where $P_S$ is spontaneous polarization of the ferroelectric liquid crystal or the antiferroelectric liquid crystal, $C_{LC}$ is a capacitance between the pixel electrode and the another electrode, $C_{AD}$ is a capacitance of an auxiliary capacitor connected with the capacitance $C_{LC}$, V is a magnitude of a pulse voltage applied to the pixel electrode, W is a, width of the pulse voltage, $\tau_{LC}$ is a time constant of a pixel comprising the pixel electrode, $\tau$ is a time constant of an auxiliary circuit comprising the capacitance $C_{AD}$, S is an area of the pixel electrode, and $V_{rem}$ is a residual voltage due to residual charge between pixel electrode and the another electrode immediately before application of a next pulse.

8. The device of claim 7 wherein the auxiliary circuit further comprises a resistance provided in parallel with the capacitance $C_{AD}$.

9. The device of claim 7 wherein the electro-optical modulating layer comprises the ferroelectric liquid crystal and the ferroelectric liquid crystal has a relative dielectric constant of 4 or more.

10. The device of claim 7 wherein the electro-optical modulating layer comprises the antiferroelectric liquid crystal and the antiferroelectric liquid crystal has a relative dielectric constant of 4 or more.

11. The device of claim 7 wherein the electro-optical modulating layer comprises the ferroelectric liquid crystal and the width W is shorter than a response time of the ferroelectric liquid crystal.

12. The device of claim 7 wherein the electro-optical modulating layer comprises the antiferroelectric liquid crystal and the width W is shorter than a response time of the antiferroelectric liquid crystal.

13. The device of claim 7 wherein the electro-optical modulating layer comprises the mixture, and the polymer has a columnar shape between the pair of substrates.

14. An electro-optical device comprising:

a pair of substrates;

a transistor provided on one of the pair of substrates;

a pixel electrode provided on the one of the pair of substrates and connected with one of source and drain of the transistor;

another electrode provided on the other of the pair of substrates; and an electro-optical modulating layer provided between the pair of substrates, the electro-optical modulating layer comprising a material selected from the group consisting of a ferroelectric liquid crystal, an antiferroelectric liquid crystal and a mixture thereof with a polymer, wherein a formula $$C_{LC}\{V-V_{rem}-3V \exp(-W/\tau_{LC})\} \geq 2 P_s S$$

holds where $P_S$ is spontaneous polarization of the ferroelectric liquid crystal or the antiferroelectric liquid crystal, $C_{LC}$ is a capacitance between the pixel electrode and the another electrode, V is a magnitude of a pulse voltage applied to the pixel electrode, W is a width of the pulse voltage $\tau_{LC}$ is a time constant of a pixel comprising the pixel electrode, S is an area of the pixel electrode, and $V_{rem}$ is a residual voltage due to residual charge between the pixel electrode and the another electrode immediately before application of a next pulse.

15. The device of claim 14 wherein the electro-optical modulating layer comprises the ferroelectric liquid crystal and the ferroelectric liquid crystal has a relative dielectric constant of 6 or more.

16. The device of claim 14 wherein the electro-optical modulating layer comprises the antiferroelectric liquid crystal and the antiferroelectric liquid crystal has a relative dielectric constant of 6 or more.

17. The device of claim 14 wherein the electro-optical modulating layer comprises the ferroelectric liquid crystal and the width W is shorter than a response time of the ferroelectric liquid crystal.

18. The device of claim 14 wherein the electro-optical modulating layer comprises the antiferroelectric liquid crystal and the width W is shorter than a response time of the antiferroelectric liquid crystal.

19. The device of claim 14 wherein the electro-optical modulating layer comprises the mixture, and the polymer has a columnar shape between the pair of substrates.

20. An electro-optical device comprising:

a pair of substrates;

a transistor provided on one of the pair of substrates;

a pixel electrode provided on the one of the pair of substrates and connected with one of source and drain of the transistor;

another electrode provided on the other of the pair of substrates; and an electro-optical modulating layer provided between the pair of substrates, the electro-optical modulating layer comprising a material selected from the group consisting of a ferroelectric liquid crystal, an antiferroelectric liquid crystal and a mixture thereof with a polymer, wherein a formula $$\frac{C_{LC}\{V-V_{rem}-3V \exp(-W/\tau_{LC})\}+C_{AD}\{V-V_{rem}-3V \exp(-W/\tau)\}}{P_s S} \geq 2$$

holds where $P_S$ is spontaneous polarization of the ferroelectric liquid crystal or the antiferroelectric liquid crystal, $C_{LC}$ is a capacitance between the pixel electrode and the another electrode, $C_{AD}$ is a capacitance of an auxiliary capacitor connected with the capacitance $C_{LC}$, V is a magnitude of a pulse voltage applied to the pixel electrode, W is a width of the pulse voltage, $\tau_{LC}$ is a time constant of a pixel comprising the pixel electrode, S is an area of the pixel electrode, $\tau$ is a time constant of an auxiliary circuit comprising the capacitance $C_{AD}$, and $V_{rem}$ is a residual voltage due to residual charge between the pixel electrode and the another electrode immediately before application of a next pulse.

21. The device of claim 20 wherein the auxiliary circuit further comprises a resistance provided in parallel with the capacitance CAD.

22. The device of claim 20 wherein the electro-optical modulating layer comprises the ferroelectric liquid crystal and the ferroelectric liquid crystal has a relative dielectric constant of 4 or more.

23. The device of claim 20 wherein the electro-optical modulating layer comprises the antiferroelectric liquid crystal and the antiferroelectric liquid crystal has a relative dielectric constant of 4 or more.

24. The device of claim 20 wherein the electro-optical modulating layer comprises the ferroelectric liquid crystal and the width W is shorter than a response time of the ferroelectric liquid crystal.

25. The device of claim 20 wherein the electro-optical modulating layer comprises the antiferroelectric liquid crystal and the width W is shorter than a response time of the antiferroelectric liquid crystal.

26. The device of claim 20 wherein the electro-optical modulating layer comprises the mixture, and the polymer has a columnar shape between the pair of substrates.

* * * * *